United States Patent
Criss et al.

[15] 3,682,026
[45] Aug. 8, 1972

[54] METHOD AND APPARATUS FOR TRIMMING BLOW MOLDED PLASTIC ARTICLES

[72] Inventors: Donald H. Criss; Robert F. Kontz, both of Toledo, Ohio

[73] Assignee: Owens-Illinois, Inc.

[22] Filed: June 15, 1970

[21] Appl. No.: 46,243

[52] U.S. Cl. ............................82/75, 82/92, 82/101
[51] Int. Cl. ............................B23b 3/04, B23b 5/14
[58] Field of Search............82/46, 48, 70.2, 70.1, 71, 82/72, 73, 74, 75, 76, 77, 83, 85, 92, 93, 101, 102

[56] References Cited

UNITED STATES PATENTS

| | | | |
|---|---|---|---|
| 1,325,173 | 12/1919 | Shirlow et al. | 82/48 |
| 2,395,200 | 2/1940 | Smiley | 82/76 |
| 1,806,475 | 5/1931 | Lee | 82/72 X |
| 2,182,301 | 12/1939 | Morain | 82/70.2 |

FOREIGN PATENTS OR APPLICATIONS

| | | | |
|---|---|---|---|
| 148,218 | 4/1961 | U.S.S.R. | 82/101 |
| 7,011 | 1/1916 | Great Britain | 82/48 |
| 525,704 | 5/1931 | Germany | 82/48 |
| 13,837 | 7/1905 | Great Britain | 82/73 |
| 325,913 | 1/1958 | Switzerland | 82/73 |

Primary Examiner—Harrison L. Hinson
Attorney—Philip M. Rice and E. J. Holler

[57] ABSTRACT

This invention relates to a cutting apparatus for removing integral molding flash from a plastic article, such as flash from the neck of a blow molded bottle. Such flash is necessarily formed during the molding operation and projects axially beyond the desired neck opening of a narrow-neck bottle, for example.

The specific cutting means includes a plurality of levers medially pivoted on a support element which is advanced to a given distance from the desired line of cut, the support element being rotatable and the levers rotating with the element about an axis aligned with the flash axis. Each such lever carries a cutter at its flash-adjacent end, and cam means contact the remote end of each lever. Upon movement of the cam toward the flash, the levers are pivoted to contact the cutters with the flash, which is thereby severed. The cams continue to retain the cutters in contact with the flash as the support element is withdrawn to remove the severed flash from the severing location.

1 Claim, 4 Drawing Figures

INVENTORS
DONALD H. CRISS
ROBERT F. KONTZ
BY
Philip M. Rice
& E. J. Holler
ATTYS.

METHOD AND APPARATUS FOR TRIMMING BLOW MOLDED PLASTIC ARTICLES

RELATED APPLICATIONS

The severing mechanism of this invention is specifically designed for use with the overall trimming machine illustrated in our co-pending application, Ser. No. 17,824, filed in the U.S. Pat. Office on Mar. 9, 1970, and assigned to the assignee of this application.

BACKGROUND OF THE INVENTION

In our related application, above-identified, we have described and claimed a trimming mechanism for the removal of flash from a blow-molded plastic bottle of the "wide-mouth" variety, i.e., where the dispensing neck of the bottle is provided with an opening which is sufficiently wide to accommodate the entry of flash-severing elements. This earlier described mechanism is not generally adaptable to the trimming of bottles having more restricted dispensing openings, or bottles of the "narrow-neck" variety.

In such a narrow-neck bottle, it is necessary that the severing take place by cutting elements disposed entirely exteriorly of the bottle and its integral flash. Further, the flash is often wider than the opening which is to be formed. Additionally, the flash generally projects axially beyond the line of severance, which line of severance, of course, forms the final dispensing opening of the bottle.

Thus, it is necessary to provide a cutting means which can sever the flash without the provision of opposing cutting elements positioned inside and outside the flash at the point of cut, to provide a flash severing mechanism which can sever the flash at a point which is smaller radially than the portions of the flash, and to provide a flash severing mechanism which can accommodate flash portions projecting axially beyond the point of cut.

BRIEF DESCRIPTION OF THE PRESENT INVENTION

The present invention provides a flash severing mechanism which meets the above-defined requirements and which is effective in the severing of flash from narrow-neck bottles and the like.

To carry out this operation, the present invention utilizes the plurality of rotary cutter elements (preferably three in number) which are carried at the ends of medially pivoted levers. These levers are medially pivoted to a carrying support element which is rotatable and axially advanceable and retractable relative to the finish being severed by the actuating mechanism which is disclosed in our earlier application, above-identified.

The remote ends of the levers are biased against an axially displaceable cam element, this cam element, when advanced, contacting the cutting elements with the flash. When retracted, the cam element allows the cutting elements to spread radially.

When the cam elements are spread and the carrier is advanced toward the flash-bearing article, the cutting elements are axially telescoped over the flash. Adjustable abutment means on the carrier are provided to position the cutter elements in radial alignment with desired line of cut. When the cam is advanced, the cutter elements are swung relative to the support element into contact with the flash and rotation of the cutting element around the axis of the flash severs the flash from the remainder of the container or the article, and the cutter elements are retracted axially from the location of cutting, carrying the flash with the retracting cutting elements. Upon retraction of the cam, the cutting elements are spread apart to release the severed flash.

Biasing means are provided to retain the remote ends of the levers in constant contact with the cam means, the cam itself is normally biased to its cutter-spreading position.

The flash-severing mechanism of the present invention is integrated into that overall turning machine structure shown in our above-identified patent application, it is not necessary to describe all of the detail of this severing mechanism in this application. However, in our earlier application, we have disclosed an overall rotary trim apparatus in which stationary, circular cam means which are traversed by movable followers for actuating a flash-severing mechanism is shown. This same cam-follower mechanism is utilized in this application. One of the cams of this earlier mechanism is utilized to advance the rotatable shaft toward the flash to be removed, until such time as the abutment on the shaft contacts the flash. When this position is reached, the cutter is positioned to be swung into engagement at the precise line of cut which is desired. Next, the second of the cams is utilized to actuate the cutters, through the shaft-mounted cutter cam, to actuate the cutters into cutting engagement with the flash. Since the cutter cam is moved relative to the shaft to move the cutting discs into engagement with the flash, the cam is retained in its actuated position to insure the removal of the flash from the location of the cut as the shaft is actuated rearwardly. Thus, when the cam is retracted to spread the cutting discs, the severed flash is released in spaced location to the point of cut, and there is no opportunity for the flash to interfere with or to fall into the container from which it has been severed.

It is, therefore, an important object of the present invention to provide an improved flash-severing apparatus operable to sever flash from a narrow-neck bottle or the like by cutting action performed completely outside the confines of the bottle.

It is another important object of this invention to provide an improved flash-severing mechanism utilizing a plurality of rotatable, pivotally mounted, cam-actuated levers carrying rotatable cutting elements for actuation into and out of severing relation with integral flash formed on a plastic article.

Another, and no less important, object of the present invention is the provision of a cutting apparatus for removing integral flash from a plastic bottle or the like which is telescopic over an axially elongated, radially enlarged flash portion of the article to sever the flash at a desired point to form a finished bottle.

Other and further objects of the present invention will become readily apparent from the disclosure and claims hereinafter set forth.

Figure 1:
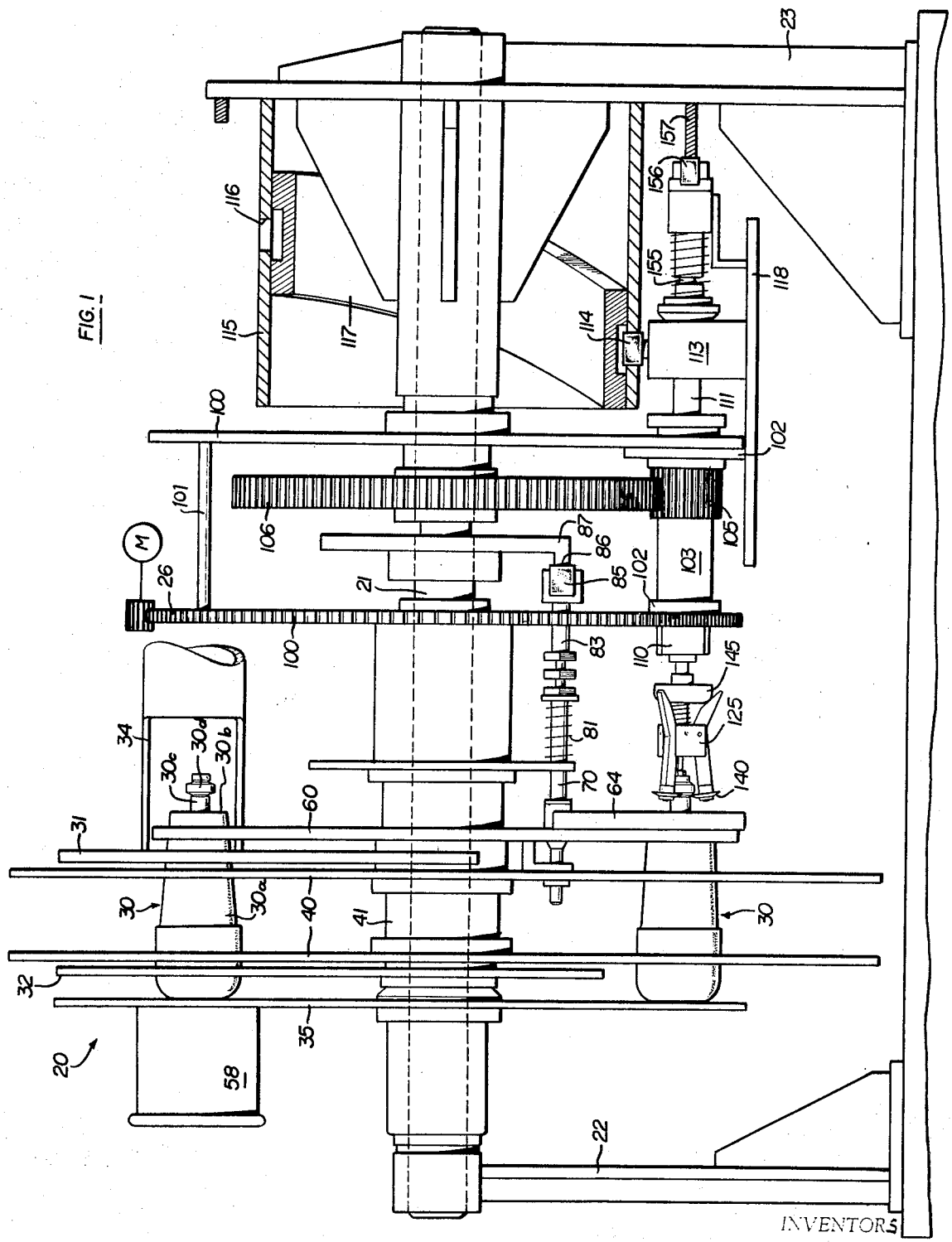
FIG. 1 is a side elevational view, with parts shown in section, of an overall bottle trimming apparatus incorporating the present invention.

AS SHOWN ON THE DRAWINGS:

In FIG. 1, reference numeral 20 refers generally to a trimming apparatus of the type shown in our earlier, above-identified application. Since the overall trimming apparatus is essentially the same as in the present invention, and the present invention resides in the specific cutting or flash-severing apparatus, it does not appear necessary to illustrate and describe in detail all of the trimming apparatus. Reference to our earlier filed application is herein made for purposes of disclosure of the overall apparatus.

Generally, the apparatus 20 comprises a horizontally extending fixed shaft 21 supported on vertical standards 22 and 23. A drive sprocket 26 formed peripherally of a plate 100 rotates on the shaft 21 and is driven by a motor M.

A pair of spaced identical fixed side sheets 31 and 32 are fixed to the non-rotatable shaft 21 adjacent one end of the apparatus. The plate 31 carries a bottle inlet tube 34 of a size to accommodate the passage of a bottle 30.

The term "bottle" encompasses other blown plastic articles, but is used simply ease of reference. The bottles are inserted into the tube 34, preferably in individual sequence, with their bottom ends meeting, so that the bottles are fed, as by gravity, to their positions shown in FIG. 1. The bottom of the bottle abuts a stop sheet 35 positioned adjacent the side sheet 32 to stop the motion of the bottle through the tube.

Mounted on the shaft 21 for rotation thereabout by the motor M are a pair of side plates 40 which are identical to the plates 40 described in our earlier application. These plates 40 are paralleled to one another and are spaced by a collar 41 mounted on the shaft. Each plate 40 is provided with a plurality of peripheral pockets into which the bottles 30, in series, are cammed by the side plates 31, 32, all as described in our earlier application. The bottles 30 travel peripherally with the plates until they are discharged through a discharge tube 58 peripherally spaced from the inlet tube 34 through an arc of about 340 to 350 degrees.

Also, as described in our earlier application, the bottles 30 are locked to the plates 40 by a locking plate 60, co-rotatable with the plates 40 and paralleled thereto, which carries a pair of locking levers 64. These locking levers 64 engage the bottles 30, as will hereinafter more fully be described, they are locked by elongated actuating rods 70. An extension 83 of the rod 70 is urged by spring 81 to the right (as shown in FIG. 1) to urge a cam follower 85 against the cam face 86 formed on a cam plate 87 which is fixed to the shaft 21. As the locking plate 60 rotates with the carrying plates 40, the follower 85 traverses the cam surface 86 and locks the bottle to the plates 40.

The driving sprocket 26 is formed peripherally of the support plate 100, which is jointed to a second identical support plate 100 by a longitudinal support rod 101. These plates 100 carry, adjacent their outer peripheries, a plurality of annular bearings 102 which are arranged in pairs to journal therein rotatable, generally tubular carriers 103. These carriers 103 are freely rotatable about axes parallel to the axis of the shaft 21 and are axially aligned with the longitudinal axis of the bottles 30 secured to the plates 40. Thus, the plates 40 and the plates 100 co-rotate and carry the bottles 30 and the carriers 103 in synchronized alignment during such rotation.

The carrier 103 has a cylindrical inner bore which is axially splined, and the carrier carries an exterior pinion 105 which is co-rotatable with the carrier. The pinion 105 meshes with the sun gear 106 which is fixed to the shaft 21 or, alternatively, relatively rotatable independently of the shaft for a purpose to be later described.

Projecting axially through the bore of the carrier 103 is a tubular spindle 110 which is exteriorly splined to be co-rotatable with the interiorly splined carrier 103. The spindle 110 projects to the right past the carrier 103 and carries a spindle cam follower block 113 provided with a spindle cam follower 114. Thus, the cam follower block 113 and the spindle 110 are axially co-movable.

The follower 114 contacts a fixed arcuate cam surface provided by a cylindrical cam element 115 having a complete peripheral groove 116 bridged by a groove bridge plate 117 welded to the interior periphery of the element 115. The cam element 115 is concentric with the shaft 21 and rotation of the plates 100 and the spindle 110 therewith will axially advance and retract the spindle 110 as the follower 114 traverses the fixed cam surface provided by the peripheral groove 116. A slide plate 118 carried by one of the plates 100 prevents rotation of the block 113 with the spindle 110. The contour of the cam surface provided by the groove 116, and the correlation of this cam surface with other portions of the apparatus, is identical with that disclosed in our earlier application.

Figure 2:
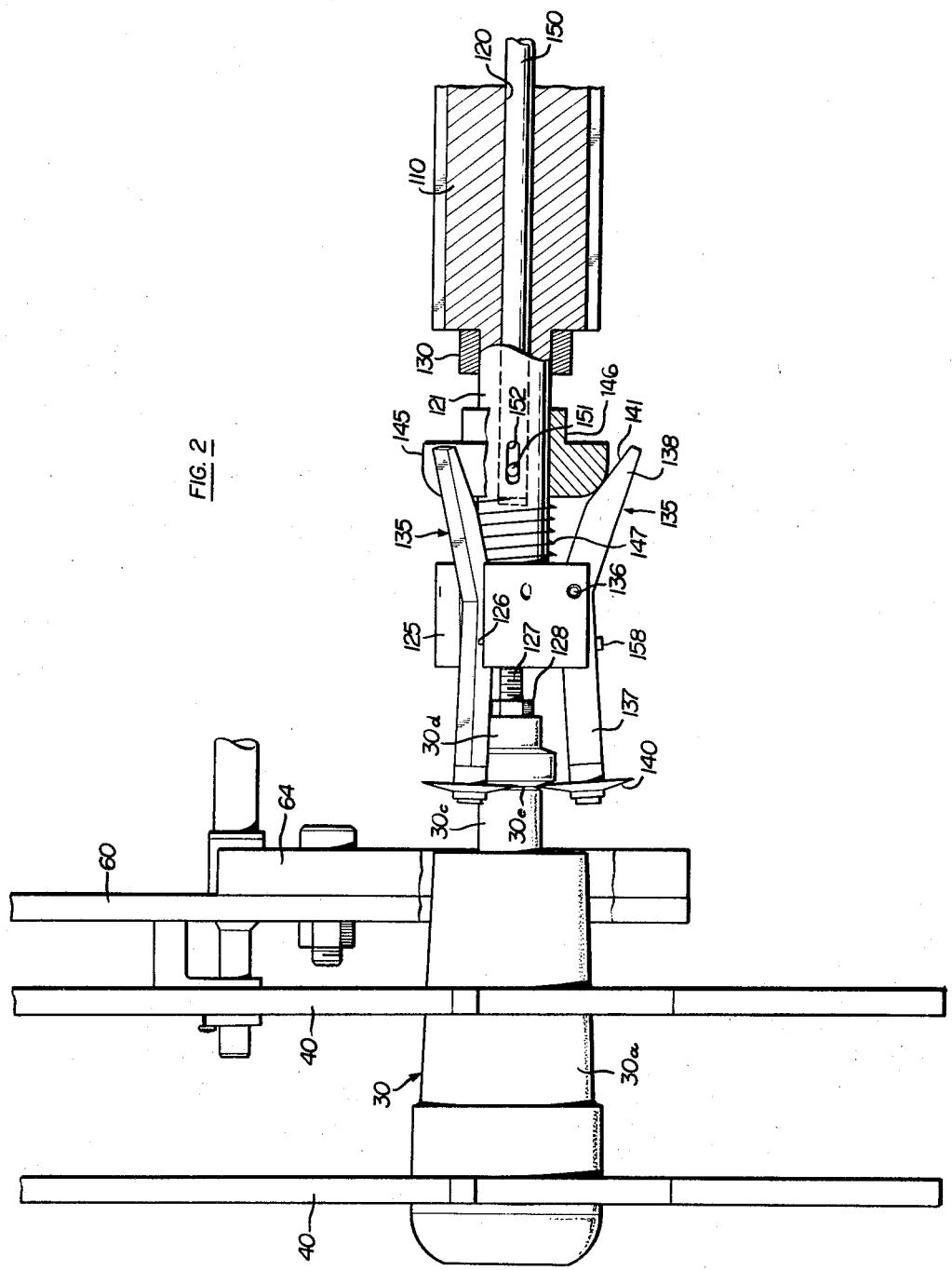
FIG. 2 is an enlarged fragmentary view similar in FIG. 1, but illustrating the device of the present invention in greater detail and in section.

As best shown in FIGS. 1 and 2, the bottle 30 is provided with a main body portion 30a which terminates in a radial shoulder 30b. From this radial shoulder, a reduced neck 30c projects axially. Attached to the remote end of the neck 30c is a bulbous waste portion 30d which is to be removed. This waste portion 30d is connected to the neck 30c by a reduced diameter portion 30e which coincides with the pouring lip of the container. The desired cut is to be made at the line 30e. It will be noted that the portion 30b is both radially and axially enlarged with respect to the neck 30c and particularly with respect to the reduced lip portion 30e.

As best shown in FIG. 2, the spindle 110 has an axial bore 120 therethrough. Projecting from the free end of the spindle 110, i.e., that end of the spindle closest to the bottle 30, is a reduced diameter axial extension 121 into which also is traversed by the bore 120. This extension 121 has mounted at its free end a fixed support block 125 which is provided with a series of peripheral, axially extending grooves 126. An adjustable stop bolt 127 having an enlarged abutment head 128 projects from the block 125 for abutment with the portion 30d of the bottle 30, as best shown in FIG. 2. Circumscribing the extension 121 is a stop collar 130, which can be axially adjusted along the length of the extension 121 and secured in position by a set screw 131.

Disposed in each of the three slots 126 of the block 125 is an elongated lever 135. These levers 135 are identical and are provided with essentially medial apertures 136 from which angularly related arms 137 and 138 project. The arms 137 project toward the bottle 30 and carry at their extremities circular, freely rotatable cutter discs 140. The arms 138 of the levers 135 are each provided with interior chamfered surfaces 141 which engage a circular cam element 145. This cam element 145 is slidable on the extension 121 and is provided with a cylindrical extension or abutment collar 146 normally engageable with the stop collar 130. A coil compression spring 147 surrounds the extension 121 and is interposed between the fixed carrier block 125 and the slidable cam 145, this compression spring normally urging the abutment collar 146 of the cam 145 against the adjacent surface of the stop 130.

The cam 145 is adapted to be displaced axially or telescopically over the extension 121 of the spindle 110 by means of an elongated actuating rod 150 which projects through the bore 120 in the spindle 110. The cam is secured to the rod 150 by a radial pin 151, and the extension 121 is provided with an axially elongated radial slot 152 to accommodate movement of the pin 151 and the cam 145 as the rod 150 is reciprocated.

The rod 150 is reciprocated axially relative to the spindle 110 and the spindle extension 121 by means of a rearward rod extension 155 (FIG. 1) carrying a cam follower 156 which engages the surface of a cam 157 fixed to the rear standard 23.

OPERATION

As illustrated in FIG. 1 of the drawings, bottles 30 are serially fed through the feed tube 30 into the notches (not shown) in the plates 40, and the bottles are locked to the plates 40 for co-rotation therewith by means of the locking levers 64 and the actuating shaft 70 therefor. This operation is in accordance with our earlier filed application and forms no part of the present invention.

Figure 3:
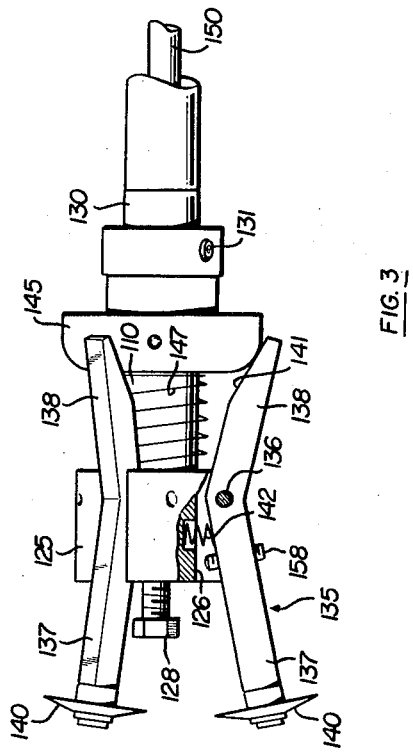
FIG. 3 is an enlarged fragmentary sectional view of the cutting elements of the device of the present invention.
Figure 4:
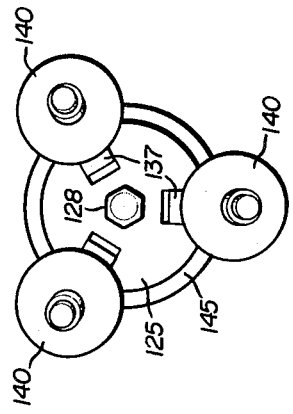
FIG. 4 is an enlarged end view of those portions of the apparatus shown in FIG. 3.

As the cam follower 114 traverses the cam track 116, the spindle 110 is advanced to the left, i.e., toward the bottle. At the same time, the rod 150 is extended to the left, so there is no relative spindle-rod movement. As a result, the spring 147 retains the cam 145 in its retracted position of FIG. 3 of the drawings. Thus, the cutter elements 140 (three in number) are spread apart radially, as illustrated in FIG. 4 of the drawings. The motion of the spindle 110 to the left, as viewed in FIG. 2 of the drawings, thus telescopes the spread-apart cutter elements over the flash or waste portion 30b of the bottle 30. The length of the arms 137 is such that flash portions of appreciable axial extent can be bridged in this manner, and the spreading of the cutter elements radially is such that the cutter elements clear the radially enlarged flash 30d. The abutment or stop 128 has been previously axially adjusted into the block 125, so that it abuts the end of the flash 30. When the cutting elements 140 are radially aligned with the line of cut 30e. At this time, the cam follower 114 is at the furthest left position of its cam track 116. However, the cam follower 156 continues to move to the left along the higher rise cam 157, thereby displacing the rod 150 to the left. Such displacement of the rod carries the pin 151 and the cam 145 further to the left. The engagement of the chamfered surfaces 141 with the cam surface 145 under the influence of lever springs 142 will spread the arms 138 of the levers 135, thus urging the free arms 137 of the levers toward one another. Such movement of the arms 137 of the levers 135 will bring the rotarary cutting elements 140 into engagement with the bottle 30 at the exact desired line of cut 30e. Continued rotation of the spindle 110 and the remainder of the cutter simply will traverse the line of cut 30e with the cutters 140 and sever the flash portion 30b from the remainder of the bottle. The set screws 158 limit the penetration of the cutters 140 into the flash.

Next, the cutters 140 preferably remain in their bottle-engaging positions of FIG. 2 after severance and as the spindle 110 begins to retract. By so retaining the cutters in their innermost position, the severed flash portion 30b is retained between the lever arms 137 during such retraction. After retraction is initiated, the cam 145 can be retracted by retraction of the rod 150 at a faster rate than the spindle 110 is being retracted, and the levers will return to their open position in FIG. 3. When this occurs, the severed flash 30b will be released.

What is claimed is:

1. In an apparatus for severing flash from a plastic article, the flash being in the form of a bulbous, radially and axially enlarged projection beyond the desired line of severing, a cutter carrying block axially aligned with said article, a plurality of circumferentially spaced carrying levers each medially pivoted to said block, each such lever having a first free end projecting toward said article and carrying an inwardly projecting cutter and each such lever having a second free end projecting away from said article, the pivotal connection of said levers to said block accommodating movement of said levers relative to said block between first positions at which said cutters are spread radially to an extent greater than the radial extent of said bulbous projection and second positions at which said cutters are spread to an extent less than the radial extent of the desired line of severing, means for axially moving said block toward said article with the cutters in their first positions to radially align the cutters with the desired line of severing, a cam coaxial with said article and said block and movable toward said block in engagement with the free ends of said levers for pivoting said levers from their first to their second positions, means for relatively rotating said block and said article to sever the flash therefrom, and means for jointly axially moving said block and said cam from said article with the cutters in their second positions to remove the flash axially therewith.

* * * * *